United States Patent
Hayashi

(10) Patent No.: US 10,822,508 B2
(45) Date of Patent: Nov. 3, 2020

(54) AQUEOUS INKJET INK AND METHOD FOR PRODUCING PRINTED ITEM

(71) Applicant: RISO KAGAKU CORPORATION, Tokyo (JP)

(72) Inventor: Akiko Hayashi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/016,015

(22) Filed: Jun. 22, 2018

(65) Prior Publication Data

US 2019/0352522 A1 Nov. 21, 2019

(30) Foreign Application Priority Data

May 18, 2018 (JP) .................. 2018-096139

(51) Int. Cl.
| | |
|---|---|
| *C09D 11/322* | (2014.01) |
| *B41J 2/01* | (2006.01) |
| *C09D 11/033* | (2014.01) |
| *B41J 2/21* | (2006.01) |

(52) U.S. Cl.
CPC .............. *C09D 11/322* (2013.01); *B41J 2/01* (2013.01); *B41J 2/2107* (2013.01); *C09D 11/033* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | |
|---|---|---|---|
| 7,955,427 B2 | 6/2011 | Hayashi et al. | |
| 2002/0077385 A1* | 6/2002 | Miyabayashi | C09D 11/40 523/160 |
| 2008/0028980 A1* | 2/2008 | Aoki | C09D 11/30 347/100 |
| 2008/0119607 A1* | 5/2008 | Shibahara | C08G 18/0823 524/588 |
| 2010/0076150 A1 | 3/2010 | Ikoshi | |
| 2017/0009089 A1* | 1/2017 | Ishima | C09D 11/101 |
| 2018/0148589 A1* | 5/2018 | Hayashi | C09D 11/328 |
| 2018/0215938 A1* | 8/2018 | Nishiyama | B41M 7/00 |

FOREIGN PATENT DOCUMENTS

| | | |
|---|---|---|
| JP | 2005-220296 A | 8/2005 |
| JP | 2010-024335 A | 2/2010 |
| JP | 2010-070669 A | 4/2010 |
| JP | 2015-067678 A | 4/2015 |

* cited by examiner

*Primary Examiner* — Manish S Shah
(74) *Attorney, Agent, or Firm* — Hamre, Schumann, Mueller & Larson, P.C.

(57) ABSTRACT

An aqueous inkjet ink is disclosed which contains a colorant, a polyoxyethylene monoallyl ether, and water.

18 Claims, No Drawings

AQUEOUS INKJET INK AND METHOD FOR PRODUCING PRINTED ITEM

CROSS REFERENCE TO RELATED APPLICATIONS

This application is based upon and claims the benefit of priority from the prior Japanese Patent Application No. 2018-096139, filed on May 18, 2018, the entire contents of which are incorporated by reference herein.

BACKGROUND OF THE INVENTION

Field of the Invention

Embodiments of the present invention relate to an aqueous inkjet ink and a method for producing a printed item.

Description of the Related Art

Inkjet inks used in inkjet recording methods are broadly classified into aqueous inks and non-aqueous inks. Aqueous inks contain water as a solvent, and therefore particularly in those cases where plain paper is used as the recording medium, the solvent tends to penetrate readily into the recording medium, while the colorant can be easily retained at the surface of the recording medium, meaning high-density, high-quality printed images can be easily obtained. On the other hand, paper deformation such as curling and cockling may sometimes occur due to absorption of the water in the ink by the recording medium, and this type of deformation can have an effect on the transport properties of the recording medium.

With respect to inkjet inks, JP 2005-220296 A, JP 2010-70669 A, JP 2010-24335 A and JP 2015-67678 A propose technology for suppressing paper deformation.

In terms of inkjet recording methods, in recent years there have been growing demands for methods that enable printing to be performed at high speeds. In light of these demands, line inkjet printers using a line head system are becoming increasingly popular as inkjet printers capable of high-speed printing.

SUMMARY OF THE INVENTION

According to an aspect of the present invention, an aqueous inkjet ink containing a colorant, a polyoxyethylene monoallyl ether and water is provided.

According to another aspect of the present invention, a method for producing a printed item is provided, the method including applying the above aqueous inkjet ink to a recording medium using an inkjet recording method.

DETAILED DESCRIPTION OF THE EMBODIMENTS

Embodiments of the present invention are described below, but the present invention is in no way limited by the following embodiments.

When an aqueous ink is used in high-speed printing, because the paper is transported within a short time period, problems caused by paper deformation, such as paper blockages, tend to occur more frequently.

An object of an embodiment of the present invention is to provide an aqueous inkjet ink that can reduce paper deformation.

The aqueous inkjet ink (hereafter also referred to as simply "the ink") according to an embodiment of the present invention contains a colorant, a polyoxyethylene monoallyl ether, and water.

By including the polyoxyethylene monoallyl ether as a water-soluble organic solvent, paper deformation may be reduced.

The polyoxyethylene monoallyl ether is represented by formula (1) shown below. In the following formula (1), n represents a value of 2 or greater.

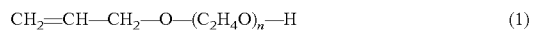

$$CH_2=CH-CH_2-O-(C_2H_4O)_n-H \quad (1)$$

The cellulose molecules in paper are bound together by hydrogen bonding, but when the paper absorbs the water in an ink, the water may penetrate the hydrogen bonds between the cellulose molecules near the surface of the paper to which the ink has been applied, resulting in cleavage of the hydrogen bonds between the cellulose molecules. As a result, the surface of the paper to which the ink has been applied may swell, and therefore immediately after application of the ink, a minus curl may be formed, with the ink application surface becoming a convex surface. Subsequently, as the water evaporates, new hydrogen bonds may form between the cellulose molecules in different locations from those prior to the hydrogen bond cleavage, and the paper shifts from a minus curl state to a plus curl state in which the ink application surface forms a concave surface with the ends of the paper lifted upward. If evaporation of the water proceeds rapidly, then this plus curl phenomenon tends to be quite marked.

Water-soluble organic solvents having two or more hydroxyl groups at the terminals (such as glycerol and triethylene glycol) may act in a similar manner to water, penetrating the hydrogen bonds between cellulose molecules and causing cleavage of the hydrogen bonds between cellulose molecules. Because polyoxyethylene monoallyl ethers have only a single hydroxyl group within each molecule as shown in formula (1) above, it is thought that these compounds are less able to penetrate between the cellulose molecules, and are therefore less likely to contribute to swelling of the paper, thus enabling a reduction in paper deformation.

In recent years, the release into the atmosphere of volatile organic compounds (hereafter sometimes abbreviated as VOC), which are organic compounds that exhibit volatility and become gaseous in the open atmosphere, is causing various problems, including pollution which may cause health concerns and the like. Although high-speed printing enables multiple printed items to be output in a short period of time, the amount of VOC emissions tends to increase.

When a polyoxyethylene monoallyl ether is used, the amount of VOC emissions can be reduced. As shown in formula (1), because polyoxyethylene monoallyl ethers have a hydroxyl group (OH group), hydrogen bonds may occur between molecules. Further, because polyoxyethylene monoallyl ethers have a structure in which one or more oxyethylene groups are added to an ally ether, the molecular weight is comparatively high. It is thought that because of the actions of the intermolecular forces and the size of the molecular weight, the volatility of polyoxyethylene monoallyl ethers may be suppressed.

Further, in those cases where a printed item prepared using an aqueous ink is brought into contact with a styrene/acrylic resin toner printed item, the two printed items may sometimes stick together. When a polyoxyethylene monoallyl ether is used, adhesion of the obtained printed item to styrene/acrylic resin toner printed items can be suppressed.

It is thought that when an aqueous ink contains a water-soluble solvent of low polarity, adhesion between printed items prepared using the aqueous ink and styrene/acrylic resin toner printed items may occur as a result of the low-polarity water-soluble solvent dissolving the resin of the styrene/acrylic resin toner. However, it is thought that because polyoxyethylene monoallyl ethers tend to have comparatively high polarity, they are unlikely to dissolve the resins of styrene/acrylic resin toners, meaning that when a polyoxyethylene monoallyl ether is used, adhesion between the resulting printed items and styrene/acrylic resin toner printed items may be suppressed.

In the polyoxyethylene monoallyl ether, there are no particular limitations on the number of added moles of ethylene oxide (namely, the value of n in the above formula (1)), provided the number is at least 2. When the number of added moles of ethylene oxide is 3 or greater, the compound tends to be even less likely to volatilize. From the viewpoint of reducing VOC, the number of added moles of ethylene oxide is preferably at least 3, and is more preferably 4 or greater. In a case where an ink is prepared using a polyoxyethylene monoallyl ether in which the number of added moles of ethylene oxide is not more than 10, the ink viscosity can be kept within a more appropriate range, facilitating an improvement in the ink dischargeability, and therefore the number of added moles of ethylene oxide is preferably not more than 10, and more preferably 8 or less.

The ink may contain a single polyoxyethylene monoallyl ether, or a combination of two or more polyoxyethylene monoallyl ethers may be used.

Although there are no particular limitations on the ratio between the amounts of the polyoxyethylene monoallyl ether and the water in the ink, the mass ratio of the amount of the polyoxyethylene monoallyl ether in the ink relative to the amount of water in the ink is preferably less than 0.5, and more preferably 0.45 or less.

When the mass ratio of the amount of the polyoxyethylene monoallyl ether in the ink relative to the amount of water in the ink is less than 0.5, the amount of curling (degree of curling) following drying may be more easily suppressed. It is thought that this is because when the mass ratio of the amount of the polyoxyethylene monoallyl ether in the ink relative to the amount of water in the ink is less than 0.5, the printed surface is comparatively less able to retain water.

There are no particular limitations on the amount of the polyoxyethylene monoallyl ether in the ink.

The amount of the polyoxyethylene monoallyl ether in the ink is preferably at least 10% by mass, more preferably at least 15% by mass, and even more preferably 20% by mass or greater. Further, the amount of the polyoxyethylene monoallyl ether in the ink is preferably not more than 40% by mass, more preferably not more than 35% by mass, and even more preferably 30% by mass or less. When the amount of the polyoxyethylene monoallyl ether in the ink is at least 10% by mass, the suppression effect on paper deformation can be realized more easily. When the amount of the polyoxyethylene monoallyl ether in the ink is not more than 40% by mass, the ink viscosity is less apt to too high, and the ink tends to be dischargeable without heating, meaning power consumption can be more easily reduced.

A pure water such as ion-exchanged water or distilled water, or ultrapure water, is preferably used as the water.

The amount of water in the ink is preferably at least 50% by mass, more preferably at least 55% by mass, even more preferably at least 60% by mass, and further preferably 65% by mass or greater. When the amount of water in the ink satisfies this range, the solvent ratio in the ink tends to be comparatively low, and therefore the printed surface is comparatively less able to retain water, meaning a minus curl is even less likely to be maintained.

The amount of water in the ink is preferably not more than 85% by mass, more preferably not more than 80% by mass, and even more preferably 75% by mass or less. When the amount of water satisfies this range, cellulose damage caused by the water can be more easily reduced, and the amount of curling following drying can be further reduced.

For the colorant, any one selected from the group consisting of pigments and dyes may be used singly, or two or more selected from the group consisting of pigments and dyes may be used in combination.

Specific examples of pigments that may be used include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue and aniline black); inorganic pigments, examples thereof including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black.

When the ink contains a pigment, a pigment dispersant may be added to enable stable dispersion of the pigment within the ink. Examples of the pigment dispersant include activators such as higher fatty acid salts, alkyl sulfates, alkyl ester sulfates, alkyl sulfonates, sulfosuccinates, naphthalene sulfonates, alkyl phosphates, polyoxyalkylene alkyl ether phosphates, polyoxyalkylene alkyl phenyl ethers, polyoxyethylene polyoxypropylene glycols, glycerol esters, sorbitan esters, polyoxyethylene fatty acid amides and amine oxides, as well as block copolymers and random copolymers formed from two or more monomers selected from among styrene, styrene derivatives, vinylnaphthalene derivatives, acrylic acid, acrylic acid derivatives, maleic acid, maleic acid derivatives, itaconic acid, itaconic acid derivatives, fumaric acid and fumaric acid derivatives, and salts of these copolymers.

Self-dispersing pigments may be used as the pigment. The self-dispersing pigment is preferably a pigment in which a hydrophilic functional group having ionicity has been introduced at the pigment surface. By anionically or cationically charging the pigment surface, the pigment particles can be stably dispersed in water by electrostatic repulsion. Examples of preferred anionic functional groups include a sulfonate group, carboxyl group, carbonyl group, hydroxyl group, phosphonate group or phosphate group. Examples of preferred cationic functional groups include quaternary ammonium groups and quaternary phosphonium groups. Among these functional groups, an anionic group such as a carboxyl group, hydroxyl group or phosphate group is particularly preferred.

These hydrophilic functional groups may be bonded directly to the pigment surface, or bonded via another group of atoms. Examples of this other group of atoms include alkylene groups, a phenylene group and a naphthylene group, but this is not an exhaustive list. Examples of the method used for treating the pigment surface include a diazotization treatment, sulfonation treatment, hypochlorous acid treatment, humic acid treatment, and vacuum plasma treatment.

Examples of commercially available self-dispersing pigments include the products CAB-O-JET 300 and CAB-O-

JET 400 manufactured by Cabot Corporation, the products BONJET BLACK CW-1, BONJET BLACK CW-1S and BONJET BLACK CW-2 manufactured by Orient Chemical Industries, Ltd., and the product Aqua-Black 162 manufactured by Tokai Carbon Co., Ltd.

Examples of dyes include basic dyes, acid dyes, direct dyes, soluble vat dyes, acid mordant dyes, mordant dyes, reactive dyes, vat dyes and sulfide dyes. Among these, water-soluble dyes are preferred. More specific examples of the dyes include azo dyes, methine dyes, azomethine dyes, xanthene dyes, quinone dyes, phthalocyanine dyes, triphenylmethane dyes and diphenylmethane dyes.

These pigments and dyes may be used individually, or an appropriate combination of colorants may be used.

The amount of the colorant (namely, the colorant solid fraction) in the ink is preferably within a range from about 0.1 to 25% by mass, more preferably from 1 to 20% by mass, more preferably from 3 to 15% by mass, and even more preferably from 5 to 15% by mass.

In addition to the polyoxyethylene monoallyl ether, one or more other water-soluble organic solvents may also be added to the ink, provided they do not impair the effects of the present invention. These other water-soluble organic solvents may be selected appropriately from organic compounds that are liquid at room temperature and soluble in water.

The amount of the polyoxyethylene monoallyl ether in the ink, relative to the total mass of all the water-soluble organic solvent in the ink, is preferably at least 50% by mass, and more preferably 80% by mass or greater. The amount of the polyoxyethylene monoallyl ether in the ink may be, for example, 100% by mass, relative to the total mass of all the water-soluble organic solvent in the ink.

If necessary, the ink may also include any one or more of the various additives typically used in the technical field, provided addition of these additives does not impair the object of the present invention.

Specifically, any one or more of an anionic surfactant, a cationic surfactant, an amphoteric surfactant or a nonionic surfactant may be added to the ink as a pigment dispersant, an antifoaming agent, a surface tension reducer or the like. Any one or more of a polymer-based surfactant, a silicone-based surfactant or a fluorine-based surfactant may be added to the ink as a pigment dispersant, an antifoaming agent, a surface tension reducer or the like.

There are no particular limitations on the surfactants, and preferable examples of the surfactant include acetylene glycol-based surfactants, polyoxyethylene alkyl phenols, polyoxyethylene alkyl ethers, and polyoxyethylene fatty acid esters and the like. Specific examples of acetylene glycol-based surfactants include Surfynol 465 and Surfynol 104 (manufactured by Air Products and Chemicals, Inc.), and OLFINE STG and OLFINE E1010 (manufactured by Nissin Chemical Industry Co., Ltd.).

An electrolyte may be added to the ink to adjust the ink viscosity. Examples of the electrolyte include sodium sulfate, potassium hydrogen phosphate, sodium citrate, potassium tartrate and sodium borate. One of these compounds may be used singly. Two or more of these compounds may be used in combination.

A conventional pH modifier may be added to adjust the pH of the ink. Examples of a compound which may be used as a pH modifier or as an ink thickening assistant include sulfuric acid, nitric acid, acetic acid, sodium hydroxide, potassium hydroxide, ammonium hydroxide and triethanolamine.

By adding an antioxidant, oxidation of the ink components can be prevented, and the storage stability of the ink can be improved. Examples of antioxidants that may be used include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented, and the storage stability of the ink can be improved. Examples of preservatives that may be used include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based or quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

The ink according to the present embodiment can be prepared by mixing components, either in a single batch or in portions, and then, if necessary, dispersing the resulting mixture using a dispersion device.

The suitable range for the viscosity of the ink may vary depending on factors such as the diameter of the nozzles in the discharge head and the discharge environment. In general, the viscosity at 23° C. is preferably within a range from 1 to 30 mPa·s, and a viscosity at 23° C. of about 1 to 10 mPa·s is suitable for use in inkjet recording devices. This viscosity represents the value at 10 Pa when the shear stress is increased from 0 Pa at a rate of 0.1 Pa/s at a temperature of 23° C.

The ink according to the present embodiment can be applied to a recording medium using an inkjet recording method to produce a printed item. The inkjet recording method may employ any of various systems, examples of which including a thermal inkjet system, a piezo inkjet system and an electrostatic inkjet system. The ink according to the present embodiment may be, for example, discharged from an inkjet head based on a digital signal, and the discharged ink droplets may be then adhered to the recording medium.

There are no particular limitations on the recording medium, and examples of media that may be used include plain papers, woody papers, high-quality plain papers, inkjet (IJ) papers, IJ matte papers, coated papers prepared by coating an ink-absorbing solution onto a recording medium, fine coated papers having a thinner ink-absorbing layer than coated papers, glossy papers (photo glossy papers), specialty papers and fabrics.

By using the ink of the present embodiment, paper deformation such as curling can be reduced, and therefore the paper transport properties can be improved, enabling the ink to also be applied to high-speed printing. As a result, the ink according to the present embodiment can be used favorably in line head-type inkjet printers.

Examples

The present invention is described below in further detail based on a series of examples, but the present invention is in no way limited by these examples.

<Preparation of Inks>

Formulations of inks of examples and comparative examples are shown in Tables 1 to 3. The raw materials shown in Tables 1 to 3 were mixed in the proportions shown in the tables to obtain mixtures of 100 g, and each mixture was then stirred for 10 minutes at a rotational rate of 50 rpm using an AS ONE Mix Rotor VMR-5R. Following stirring, each mixture was filtered through a membrane filter having a pore size of 0.8 µm, thus obtaining inks of Examples 1 to 11 and Comparative Examples 1 to 3.

The amounts of the "pigment dispersion" and "dye" shown in Tables 1 to 3 indicate the amounts of the pigment dispersion (CW-2 or COJ300) and the dye (Food Black 2) shown in the tables. Further, in Tables 1 to 3, the amount of the pigment (solid fraction) or dye (solid fraction) in the ink is also shown as the "amount (solid fraction) of pigment or dye in the ink", and the total amount of water in the ink including the water in the pigment dispersion is shown as the "amount of water in the ink".

The raw materials used are listed below.

1. Pigment Dispersions

CW-2: a self-dispersing carbon black dispersion, BON-JET BLACK CW-2, solid fraction: 15% by mass, manufactured by Orient Chemical Industries, Ltd.

COJ300: a self-dispersing carbon black dispersion, CAB-O-JET 300, solid fraction: 14.9% by mass, manufactured by Cabot Corporation.

2. Dye

Food Black 2: a black dye, Food Black 2, solid fraction: 100% by mass, manufactured by Daiwa Dyestuff Mfg. Co., Ltd.

3. Organic Solvents

Polyoxyethylene monoallyl ether (containing 4 mol of added ethylene oxide (EO)), manufactured by Nippon Nyukazai Co., Ltd.

Polyoxyethylene monoallyl ether (containing 8 mol of added ethylene oxide (EO)), manufactured by NOF Corporation.

Triethylene glycol, manufactured by Kanto Chemical Co., Inc.

Glycerol: manufactured by Wako Pure Chemical Industries, Ltd.

Diethylene glycol monobutyl ether, manufactured by Wako Pure Chemical Industries, Ltd.

4. Surfactant

OLFINE E1010: an acetylene glycol-based surfactant, manufactured by Nissin Chemical Industry Co., Ltd.

5. Water

Ion-exchanged water

<Evaluations>

The inks of the examples and comparative examples were each subjected to the following evaluations. The results are shown in Tables 1 to 3.

1. Ink Viscosity

The viscosity of each ink was measured. The ink viscosity refers to the viscosity at 10 Pa when the shear stress was increased from 0 Pa at a rate of 0.1 Pa/s at a temperature of 23° C., and was measured using a Rheometer AR-G2, manufactured by TA Instruments, Inc. (cone angle: 2°, diameter 40 mm).

2. Paper Deformation

Using a plain paper (RISO Paper Thin Type, manufactured by RISO KAGAKU CORPORATION) or a woody paper (Tomazara, manufactured by Oji Holdings Corporation) that had been cut to dimensions of 50 mm×100 mm as the recording medium, a bar coater P0.08H4S (manufactured by OSG System Products Corporation) was used to apply each ink to the recording medium using the coating amount shown in Tables 1 to 3, thereby forming a borderless black solid image of 50 mm×100 mm.

The paper with the black solid image formed thereon was placed on a horizontal surface with the image formation surface facing upward, and the amount of paper deformation was measured 3 seconds after, and then 24 hours after, formation of the black solid image. For the paper laying on the horizontal surface with the image formation surface facing upward, the amount of paper deformation was measured as the maximum height from the horizontal surface of those portions of the paper lifted above the horizontal surface due to paper deformation. In the case of convex deformation where the image formation surface becomes a convex surface, the amount of deformation was measured as a minus value, whereas in the case of concave deformation where the image formation surface becomes a concave surface, the amount of deformation was measured as a plus value. The measured amount of paper deformation was evaluated against the following criteria.

(1) Amount of Deformation 3 Seconds after (Immediately after) Image Formation

A: $-10$ mm≤amount of deformation≤10 mm

B: $-16$ mm≤amount of deformation<$-10$ mm, or 10 mm<amount of deformation≤16 mm C: amount of deformation<$-16$ mm, or 16 mm<amount of deformation (2) Amount of Deformation 24 Hours after Image Formation (after Drying)

A: $-5$ mm≤amount of deformation≤5 mm

B: $-17$ mm≤amount of deformation<$-5$ mm, or 5 mm<amount of deformation≤17 mm

C: amount of deformation<$-17$ mm, or 17 mm<amount of deformation

3. Adhesion to Styrene/Acrylic Resin Toner Printed Item

Using Fuji Xerox ApeosPort C3626 special toner (manufactured by Fuji Xerox Co., Ltd.) (a styrene/acrylic resin toner), a black solid image with a white border of 20 mm was formed on an A4-size sheet of RISO Paper Thin Type using a Fuji Xerox ApeosPort C3626 apparatus (manufactured by Fuji Xerox Co., Ltd.). Subsequently, 0.2 g of the ink of the example or comparative example was dripped onto the printed image, and a white sheet of A4-size RISO Paper Thin Type was then overlaid on top of the printed image and left to stand for one week in an environment at 23° C. and 50% RH. After this standing period, if no adhesion of the ApeosPort C3626 toner to the overlaid RISO Paper Thin Type was noticeable, an evaluation of A was awarded, whereas if adhesion was confirmed, an evaluation of C was awarded.

4. VOC

For each of the organic solvents used in the examples and comparative examples (namely, polyoxyethylene monoallyl ether (containing 4 mol of added ethylene oxide (EO)), polyoxyethylene monoallyl ether (containing 8 mol of added ethylene oxide (EO)), triethylene glycol, glycerol, and diethylene glycol monobutyl ether), a gas chromatography analysis was performed using a TD-20 apparatus manufactured by Shimadzu Corporation, and a determination was made as to whether or not peaks could be detected within the region from n-hexane to n-hexadecane, which act as VOC indicators. The results revealed that, among these organic solvents, peaks were detected in the range from n-hexane to n-hexadecane for the diethylene glycol monobutyl ether, but no peaks were detected in the range from n-hexane to n-hexadecane for the other organic solvents (polyoxyethylene monoallyl ether (containing 4 mol of added ethylene oxide (EO)), polyoxyethylene monoallyl ether (containing 8 mol of added ethylene oxide (EO)), triethylene glycol and glycerol).

The level of VOC was evaluated on the basis of whether or not an organic solvent was used for which peaks were detected in the range from n-hexane to n-hexadecane. Inks that did not use an organic solvent for which peaks were detected in the range from n-hexane to n-hexadecane were awarded an evaluation of A, whereas inks that used an organic solvent for which peaks were detected in the range from n-hexane to n-hexadecane were awarded an evaluation of C.

TABLE 1

| | (% by mass) | Example 1 | Example 2 | Example 3 | Example 4 | Example 5 |
|---|---|---|---|---|---|---|
| Pigment dispersion | CW-2 (solid fraction: 15% by mass) | 53.3 | 53.3 | | 53.3 | 53.3 |
| | COJ300 (solid fraction: 14.9% by mass) | | | 53.8 | | |
| Dye | Food Black 2 (solid fraction: 100% by mass) | | | | | |
| Solvent | Polyoxyethylene monoallyl ether EO: 4 mol | | | | | |
| | Polyoxyethylene monoallyl ether EO: 8 mol | 31.8 | 26.8 | 21.8 | 21.8 | 21.8 |
| | Triethylene glycol | | | | | |
| | Glycerol | | | | | |
| | Diethylene glycol monobutyl ether | | | | | |
| Surfactant | OLFINE E1010 | 0.2 | 0.2 | 0.2 | 0.2 | 0.2 |
| | Total | 100.0 | 100.0 | 100.0 | 100.0 | 100.0 |
| | Polyoxyethylene monoallyl ether/water (mass ratio) | 0.53 | 0.41 | 0.31 | 0.31 | 0.31 |
| | Amount of water in ink (% by mass) | 60.0 | 65.0 | 70.0 | 70.0 | 70.0 |
| | Amount of pigment or dye (solid fraction) in ink (% by mass) | 8.0 | 8.0 | 8.0 | 8.0 | 8.0 |
| | Ink viscosity (23° C., mPa·s) | 7.0 | 5.8 | 4.7 | 4.7 | 4.7 |
| Paper deformation | Paper type | plain paper | plain paper | plain paper | plain paper | plain paper |
| | Ink coating amount (g/m$^2$) | 10 | 9 | 8 | 9 | 15 |
| | After 3 seconds (immediate curl) | B | B | B | B | B |
| | After 24 hours (curl after drying) | B | A | A | A | A |
| Water | Ion-exchanged water | 14.7 | 19.7 | 24.2 | 24.7 | 24.7 |
| | Adhesion to styrene/acrylic resin toner printed item | A | A | A | A | A |
| | VOC | A | A | A | A | A |

TABLE 2

| | % (by mass) | Example 6 | Example 7 | Example 8 | Example 9 | Example 10 | Example 11 |
|---|---|---|---|---|---|---|---|
| Pigment dispersion | CW-2 (solid fraction: 15% by mass) | 53.3 | 53.3 | 40.0 | 40.0 | 53.3 | |
| | COJ300 (solid fraction: 14.9% by mass) | | | | | | |
| Dye | Food Black 2 (solid fraction: 100% by mass) | | | | | | 6.8 |
| Solvent | Polyoxyethylene monoallyl ether EO: 4 mol | | | | | 26.8 | |
| | Polyoxyethylene monoallyl ether EO: 8 mol | 21.8 | 21.0 | 23.8 | 20.8 | | 31.8 |
| | Triethylene glycol | | | | | | |
| | Glycerol | | | | | | |
| | Diethylene glycol monobutyl ether | | | | | | |
| Surfactant | OLFINE E1010 | 0.2 | 1.0 | 0.2 | 0.2 | 0.2 | 0.2 |
| Water | Ion-exchanged water | 24.7 | 24.7 | 36.0 | 39.0 | 19.7 | 61.2 |
| | Total | 100.0 | 100.0 | 100.0 | 100.0 | 100.0 | 100.0 |
| | Polyoxyethylene monoallyl ether/water (mass ratio) | 0.31 | 0.30 | 0.34 | 0.28 | 0.41 | 0.52 |
| | Amount of water in ink (% by mass) | 70.0 | 70.0 | 70.0 | 73.0 | 65.0 | 61.2 |
| | Amount of pigment or dye (solid fraction) in ink (% by mass) | 8.0 | 8.0 | 6.0 | 6.0 | 8.0 | 6.8 |
| | Ink viscosity (23° C., mPa·s) | 4.7 | 4.7 | 4.4 | 4.0 | 4.9 | 9.7 |
| Paper deformation | Paper type | woody paper | plain paper | plain paper | plain paper | plain paper | woody paper |
| | Ink coating amount (g/m$^2$) | 11 | 9 | 9 | 9 | 9 | 9 |
| | After 3 seconds (immediate curl) | A | B | B | B | B | B |
| | After 24 hours (curl after drying) | A | A | A | A | A | B |
| | Adhesion to styrene/acrylic resin toner printed item | A | A | A | A | A | A |
| | VOC | A | A | A | A | A | A |

TABLE 3

| % (by mass) | | Comparative Example 1 | Comparative Example 2 | Comparative Example 3 |
|---|---|---|---|---|
| Pigment dispersion | CW-2 (solid fraction: 15% by mass) | 53.3 | 53.3 | 53.3 |
| | COJ300 (solid fraction: 14.9% by mass) | | | |
| Solvent | Polyoxyethylene monoallyl ether EO: 4 mol | | | |
| | Polyoxyethylene monoallyl ether EO: 8 mol | | | |
| | Triethylene glycol | 26.8 | | |
| | Glycerol | | 26.8 | |
| | Diethylene glycol monobutyl ether | | | 26.8 |
| Surfactant | OLFINE E1010 | 0.2 | 0.2 | 0.2 |
| Water | Ion-exchanged water | 19.7 | 19.7 | 19.7 |
| | Total | 100.0 | 100.0 | 100.0 |
| | Polyoxyethylene monoallyl ether/water (mass ratio) | 0.00 | 0.00 | 0.00 |
| | Amount of water in ink (% by mass) | 65.0 | 65.0 | 65.0 |
| | Amount of pigment or dye (solid fraction) in ink (% by mass) | 8.0 | 8.0 | 8.0 |
| | Ink viscosity (23° C., mPa · s) | 4.1 | 3.9 | 4.4 |
| Paper deformation | Paper type | plain paper | plain paper | plain paper |
| | Ink coating amount (g/m$^2$) | 8 | 8 | 9 |
| | After 3 seconds (immediate curl) | C | C | C |
| | After 24 hours (curl after drying) | B | B | B |
| | Adhesion to styrene/acrylic resin toner printed item | A | A | C |
| | VOC | A | A | C |

In Examples 1 to 11 which used a polyoxyethylene monoallyl ether, the amount of paper deformation was reduced compared with the comparative examples. Further, adhesion to the styrene/acrylic resin toner printed item was also suppressed. Furthermore, for the polyoxyethylene monoallyl ethers used in Examples 1 to 11, no peaks were detected in the range from n-hexane to n-hexadecane.

According to an embodiment of the present invention, an aqueous inkjet ink can be provided that is capable of reducing paper deformation.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An aqueous inkjet ink, comprising a colorant, water, and a polyoxyethylene monoallyl ether represented by the formula $CH_2=CH-CH_2-O-(C_2H_4O)_n-H$, wherein n is 2 or greater, wherein
an amount of the polyoxyethylene monoallyl ether is from 15 to 40% by mass relative to the total mass of the aqueous inkjet ink.

2. The aqueous inkjet ink according to claim 1, wherein an amount of the water is from 50 to 85% by mass relative to the total mass of the aqueous inkjet ink.

3. The aqueous inkjet ink according to claim 1, wherein a number of added moles of ethylene oxide in the polyoxyethylene monoallyl ether is from 3 to 10.

4. The aqueous inkjet ink according to claim 1, wherein a mass ratio of an amount of the polyoxyethylene monoallyl ether relative to an amount of the water is less than 0.5.

5. The aqueous inkjet ink according to claim 1, wherein a mass ratio of an amount of the polyoxyethylene monoallyl ether relative to an amount of the water is 0.45 or less.

6. The aqueous inkjet ink according to claim 1, wherein an amount of the polyoxyethylene monoallyl ether is at least 50% by mass relative to the total mass of a water-soluble organic solvent in the ink.

7. The aqueous inkjet ink according to claim 3, wherein an amount of the polyoxyethylene monoallyl ether is at least 50% by mass relative to the total mass of a water-soluble organic solvent in the ink.

8. A method for producing a printed item, the method comprising applying the aqueous inkjet ink according to claim 1 to a recording medium using an inkjet recording method.

9. The method according to claim 8, wherein an amount of the water in the aqueous inkjet ink is from 50 to 85% by mass relative to the total mass of the aqueous inkjet ink.

10. The method according to claim 8, wherein a number of added moles of ethylene oxide in the polyoxyethylene monoallyl ether in the aqueous inkjet ink is from 3 to 10.

11. The method according to claim 8, wherein in the aqueous inkjet ink, a mass ratio of an amount of the polyoxyethylene monoallyl ether relative to an amount of the water is less than 0.5.

12. The method according to claim 8, wherein in the aqueous inkjet ink, a mass ratio of an amount of the polyoxyethylene monoallyl ether relative to an amount of the water is 0.45 or less.

13. The method according to claim 8, wherein in the aqueous inkjet ink, an amount of the polyoxyethylene monoallyl ether is at least 50% by mass relative to the total mass of a water-soluble organic solvent in the ink.

14. The aqueous inkjet ink according to claim 1, wherein an amount of the polyoxyethylene monoallyl ether is 20% to 40% by mass with respect to the total mass of the aqueous inkjet ink.

15. The method according to claim 8, wherein an amount of the polyoxyethylene monoallyl ether is 20% to 40% by mass with respect to the total mass of the aqueous inkjet ink.

16. The method of claim 8, wherein the recording medium is paper.

17. The aqueous inkjet ink according to claim 6, wherein an amount of the polyoxyethylene monoallyl ether is 20% to 40% by mass with respect to the total mass of the aqueous inkjet ink.

18. The method of claim 13, wherein an amount of the polyoxyethylene monoallyl ether is 20% to 40% by mass with respect to the total mass of the aqueous inkjet ink.

* * * * *